Jan. 5, 1965    R. FISCHER    3,164,646
METHOD AND APPARATUS FOR THE PRODUCTION OF BOTTLES
AND SIMILAR HOLLOW BODIES FROM THERMOPLASTIC
SYNTHETIC SUBSTANCES
Filed Nov. 21, 1961
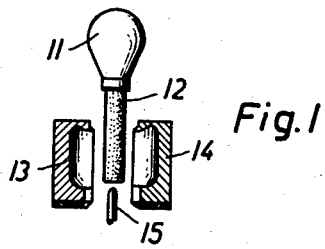
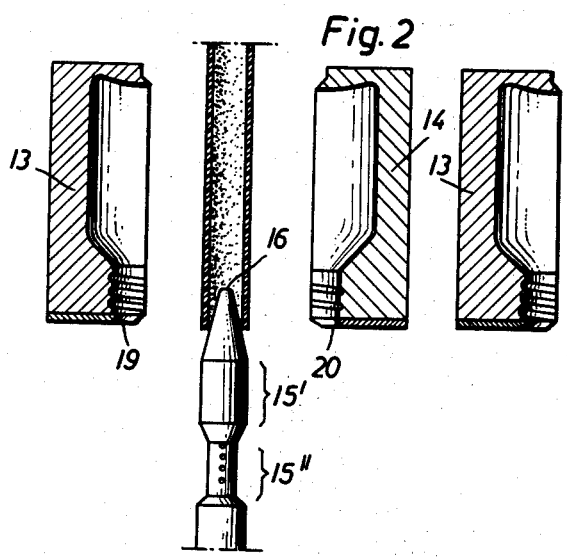
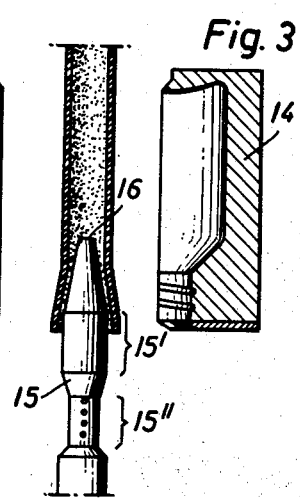
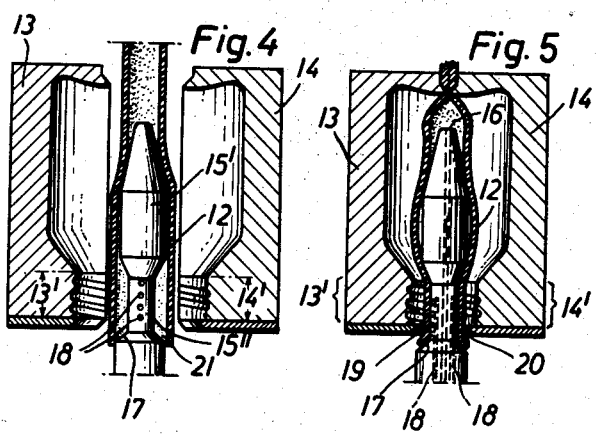
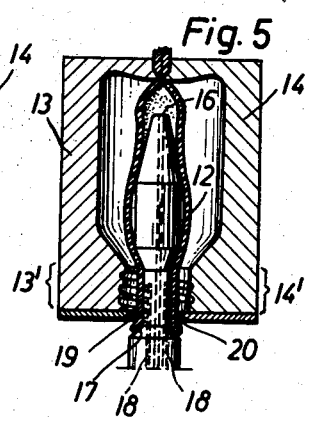
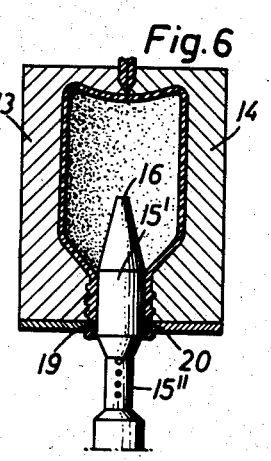
INVENTOR
RAINER FISCHER
BY
Kleinberg + Lilling

United States Patent Office 3,164,646
Patented Jan. 5, 1965

3,164,646
METHOD AND APPARATUS FOR THE PRODUCTION OF BOTTLES AND SIMILAR HOLLOW BODIES FROM THERMOPLASTIC SYNTHETIC SUBSTANCES
Rainer Fischer, Lohmar, near Cologne, Germany
Filed Nov. 21, 1961, Ser. No. 153,798
Claims priority, application Germany Nov. 24, 1960
9 Claims. (Cl. 264—98)

This invention is primarily in the art of production of hollow objects; and more specifically presents a method and apparatus for producing hollow containers and other similar hollow objects from thermoplastic materials.

It is well known in the art to produce a hollow object from thermoplastic material by first forming a tubular parison and then inflating the same within the internal cavity of a mold into the desired shape.

In such equipment, the tubular parison may be extruded over a mandrel and attaining a predetermined length, will be gripped and cut off by the closing mold halves. The parison will then be inflated into the shape of the walls of the internal cavity of the mold under the influence of a pressure medium introduced into the interior of the parison. The pressure medium may be introduced by a nozzle at the end of the mandrel. The mandrel may be located at either end of the severed length of tube and may project into the mold at least a distance equal to the length of the neck of the container or the like to be produced. During the closing of the mold and the formation of the container neck, the mandrel will serve to shape the inner wall of the container neck. The internal diameter of the container neck will then be determined by the external diameter of the mandrel.

In that the internal diameter of the tubular parison must be at least slightly larger than the external diameter of the mandrel to enable the parison to be slipped easily over the same, seams or folds will be squeezed on the neck and the adjacent parts of the container during the closing of the mold surface. These seams or folds will result in an unsatisfactory appearance to the finished object and are known in the art as tear lines.

It is a cardinal object of this invention, therefore, to produce a hollow object without seams or folds or tear lines.

It is another primary object hereof to accomplish the above relatively automatically.

Still another object and accomplishment of this invention is to produce a finished neck such as in a container, or the like, without the use of auxiliary equipment.

The above and other objects of this invention are accomplished by reducing the diameter of a portion of the parison prior to the closing of the mold. After the mold halves have closed, the parison will be expanded against the internal cavity of the mold and will thereby be given its finished shape.

For the production of containers, bottles, or the like, there will be provided then, an extrusion head for producing the tubular parison. The open molds will surround the parison as it is formed and a mandrel will project a predetermined distance into the mold for the purpose of forming the internal diameter of the bottle neck. The tubular parison will be slipped over the mandrel which will be movable in the axial direction of the container neck at least by an amount equal to the length of the said container neck. The mandrel will have parts of different diameters. One of said parts will have a diameter somewhat less than the internal diameter of the container neck and prior and during the closing of the mold, will be positioned adjacent the area of the mold utilized for forming the exterior dimensions of the container neck. Another part of the mandrel, however, will have a diameter substantially equal to the internal diameter of the finished container neck. After the closing of the mold, this part will be moved to a position adjacent the area of the mold utilized for forming the outer dimensions of the container neck. Additionally, the apparatus will be provided with a device which will, before the mold is closed, enable the parison to be inserted over the mandrel to encircle the part of the mandrel having the smaller diameter.

Furthermore, a vacuum pump may be utilized which, through suitable passages connecting to the part of the mandrel with the smaller diameter, can produce a vacuum about the said smaller diameter part so that the parison will be drawn tightly therearound.

With these objects in view, the invention consists of the novel features of construction and arrangement of parts which will appear in the following specification and recited in the appended claims, reference being had to the accompanying drawings in which the same reference numerals indicate the same parts throughout the various figures and in which:

FIG. 1 is an elevational view partially in section illustrating the basic principles of the molding apparatus.

FIGS. 2 to 6 are elevational views mainly in section illustrating a portion of the machine in operation in different consecutive stages of production.

Referring particularly to FIG. 1, there is illustrated one type of basic machine which may be utilized and which will have a head 11 to extrude a hollow tube 12. The head 11 may be fed by a worm screw or the like. The tube 12 will be extruded between the open halves 13 and 14 of a mold.

Referring now to FIGS. 1 and 2 of the drawings, it will be seen that the open end of the tube 12 will slip over the tapered tip of the mandrel 15. The said tip of the mandrel will project into the portion of the mold which will be utilized to form the neck of the container bottle or the like. Suitable means will be provided to raise or lower the mandrel 15 a predetermined distance (not illustrated).

Soon after the end of the tube 12 is slipped over the top of the mandrel 15, the mold halves 13 and 14 will be closed. Thus, a portion of the tube 12 will be between the tip of the mandrel 15 and the portion of the internal cavity of the mold which will be utilized to form the finished container neck.

The features of the above portion of the machine and apparatus will not be described in further detail in that they are relatively standard and will, therefore, form no part of the instant invention.

Of course, it will be mentioned that similar machines are known in the art which form the bottle neck at the upper portion of the mold or on which a plurality of bottles are produced simultaneously from a longer length of tubing.

However, no matter what type of machine is utilized, the internal diameter of the tube 12 heretofore had to be somewhat larger than the external diameter of the mandrel 15 to enable the said tube 12 to move easily over the same. In that in the prior art devices the tube 12 is larger, a portion of the same will be squeezed as previously described during the closing of the mold at the places which form the neck of the container. These seams, folds or tear lines have an unpleasing appearance. To avoid this, the apparatus of the instant invention is provided with a mandrel 15 which may further serve as a blowing nozzle. The said mandrel 15 will have a portion 15' with an external diameter which will be substantially equal to the internal diameter of the finished container neck. Another portion 15" of the mandrel will have a diameter which will be somewhat less than the internal diameter of the neck. In a preferred embodiment of the invention, the diameter portion 15" is smaller by at least two times the wall thickness of the tube 12.

The portions 15' and 15" will be in length at least equal to the actual length of the finished container neck. Thus, it will be possible, as will be hereinafter explained, to reduce the cross section of the tube after it is urged over the mandrel along a portion of its length which will subsequently form the container neck to such an extent that it no longer will be squeezed between the closed mold halves with the result that the formation of folds, seams, or tear lines in this area is prevented.

Referring now particularly to FIG. 3, it will be seen that after the tube 12 is lowered over the tapered tip of the mandrel 15, the lower end of the said tube 12 will be enlarged by feeding air under pressure through the nozzle (seen in FIG. 5) at the tip of the said mandrel. This will facilitate the movement of the mandrel 15 in an upward direction.

The upward movement of the mandrel 15 will cease when the portion 15" has reached the height of the portions 13' and 14' of the molds which shape the outer dimensions of the bottle neck. When in this position, the lower edge of the tube 12 will substantially pass over the narrow portion 15" of the mandrel until it comes into contact with a projecting shoulder 17 on the mandrel (as seen in FIG. 4). If the hollow space 21 thus formed is subjected to a vacuum, the tube will be urged at this portion of its length against the narrow portion 15 of the mandrel. This will accordingly reduce the dimensions of the tube 12 at this part a desired amount. The vacuum within the area 21 can be caused by passages 18.

The mold will then be closed after the vacuum has been discontinued. After the closing of the mold, the mandrel 15 will be urged downward a predetermined distance. During that downward movement, a certain amount of compressed air will be preferably introduced within the tube. The downward movement of the mandrel 15 will cease when the portion 15' is between the mold parts 13' and 14' which, as previously mentioned, will form the exterior dimensions of the container neck (as illustrated in FIG. 6). During this movement, the tube 12 will again be widened or enlarged at its lower end and will be urged tightly against the mold walls by the portion 15' of the mandrel.

The downward movement of the mandrel 15 will prevent surplus material from being urged upwards into the mold which might give an undesired appearance to the finished product. All of the surplus material can escape through the relatively small gap at the operating edges 19 and 20 provided on the undersides of the mold halves. The downward movement of the mandrel 15 cooperating with the inclined surfaces between the portions 15' and 15" will serve to close the gap between the operating edges 19 and 20 just prior to the ceasing of the downward movement of the mandrel. This will cause a sharp concentration of the material on the said operating edges and thereby will accurately fill this portion of the mold. Thus, any sharp edge formation, particularly at the edge of the container neck, and any screw thread at that portion will be formed with an accuracy never heretofore possible.

When the mandrel is at the position illustrated in FIG. 6, the tube 12 will be inflated by introduction of a suitable pressure medium to form the finished object such as a container, or the like. The mold halves may then be opened and the mandrel 15 returned to its initial position as illustrated in FIG. 1.

Thus, it is seen that there is provided herein a device and apparatus for accomplishing all of the objects of the instant invention.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claims as are stated therein, or required by the prior art.

Having thus described my invention, and illustrated its use, what I claim as new and desire to secure by Letters Patent is:

1. An apparatus for producing hollow containers or the like with finished neck dimensions of thermoplastic material, comprising:
   (a) means for forming a tubular parison of said thermoplastic material in workable form,
   (b) a partable mold positioned about said parison,
   (c) a mandrel projecting at least partially within said mold and adapted for movement in an axial direction,
   (d) said mandrel having a first part of a diameter less than the internal diameter of said neck and a second part of a diameter substantially equal to said internal diameter of said neck, said second part of said mandrel being positioned closer to the end of said mandrel within said parison than said first part of said mandrel whereby said second part of said mandrel will be within the part of said parison which will form the body of the container while said first part of said mandrel is within the part of said parison which will form the neck of the container,
   (e) means to alternately move said first part to the area of said mold which will form said neck while said mold is open and to move said second part to the area of said mold which will form said neck after said mold is closed thereby finishing the forming of said neck of said container.

2. A device as described in claim 1 further including, means for reducing the diameter of said parison in said area of said first part prior to the closing of said mold.

3. A device as described in claim 2 wherein said last mentioned means includes a suction pump connected to the space between said parison and said first part.

4. A device as described in claim 1 wherein said first part and said second part are each as long as said neck of said container.

5. A device as described in claim 1 wherein the diameter of said first part is smaller than the diameter of said second part by an amount at least twice the wall thickness of said tubular parison.

6. A device as described in claim 1 further including means to expand the remainder of said parison within said mold.

7. The method of producing containers or the like with finished neck dimensions from a tubular parison of workable material employing a mandrel having a portion with a reduced diameter and another portion of a larger diameter, and a partable blow-mold, including the steps of:
   (a) positioning the tubular parison within the parted blow-mold,
   (b) urging the mandrel at least partially within said parison until the reduced diameter portion of said mandrel is in a position between the areas of said mold which will form the neck of the container,
   (c) expanding said parison within the mold after the mold is closed,
   (d) and finishing the internal dimension of the parison in the area of the neck of the container by urging said mandrel at least partially out of said parison whereby a larger diameter portion of said mandrel will be between the areas of the mold which will form the neck of the container.

8. The method as set forth in claim 7 further including the steps of, reducing the diameter of the parison, which will form the neck of the container by a vacuum prior to the closing of the molds.

9. A device for forming hollow container from tubular parisons comprising a partable mold and a mandrel, said mandrel projecting at least partially within said mold to receive the end of said parison and being adapted for movement in a direction along the axis of said parison, said mandrel having a first part of a diameter less than the internal diameter of the neck of the container to be formed and a second part of a diameter substantially equal to said internal diameter of said neck of the container to be formed, said second part of said mandrel being positioned closer to the end of said mandrel within said parison than said first part of said mandrel whereby said second part of said mandrel will be within the part of said parison which will form the body of the container while said first part of said mandrel is within the part of said parison which will form the neck of the container, means to blow fluid under pressure from a tip of the part of the mandrel within said parison while said second part of said mandrel is moved within said parison whereby said parison will somewhat enlarge, and means to induce a vacuum between said parison and said first part of said mandrel whereby the diameter of the part of the parison corresponding to the neck of the container to be formed will be reduced prior to the closing of said mold, and means to alternately move said first part of said mandrel to the area of said mold which will form said neck while said mold is open and to move said second part to the area of said mold which will form said neck after said mold is closed thereby compressing said parison between said closed mold and said second part of said mandrel thereby forming the neck of the container.

References Cited in the file of this patent

UNITED STATES PATENTS

| | | |
|---|---|---|
| 2,928,120 | Leghorn et al. | Mar. 15, 1960 |
| 2,935,764 | Mason | May 10, 1960 |
| 2,943,349 | Adams et al. | July 5, 1960 |
| 2,964,795 | Schaich | Dec. 20, 1960 |
| 3,009,196 | Hagen | Nov. 21, 1961 |
| 3,019,481 | Negoro | Feb. 6, 1962 |
| 3,025,562 | Nelson | Mar. 20, 1962 |